United States Patent
Charhut et al.

(10) Patent No.: US 10,974,175 B2
(45) Date of Patent: Apr. 13, 2021

(54) CLARIFIER RAKE CONFIGURATION AND SYSTEM AND METHOD INCLUDING THE SAME FOR BOTTOM ASH HANDLING RELATED TO FLUE GAS DESULFURIZATION

(71) Applicants: Daniel Charhut, Lake Bluff, IL (US); Robert Heywood, Antioch, IL (US); Keith Johnson, Hawthorn Woods, IL (US); Saurabh Rastogi, Green Oaks, IL (US)

(72) Inventors: Daniel Charhut, Lake Bluff, IL (US); Robert Heywood, Antioch, IL (US); Keith Johnson, Hawthorn Woods, IL (US); Saurabh Rastogi, Green Oaks, IL (US)

(73) Assignee: United Conveyor Corporation, Waukegan, IL (US)

( * ) Notice: Subject to any disclaimer, the term of this patent is extended or adjusted under 35 U.S.C. 154(b) by 0 days.

(21) Appl. No.: 16/538,302

(22) Filed: Aug. 12, 2019

(65) Prior Publication Data

US 2021/0046405 A1    Feb. 18, 2021

(51) Int. Cl.
| | |
|---|---|
| *B01D 21/18* | (2006.01) |
| *C02F 11/121* | (2019.01) |
| *C02F 1/00* | (2006.01) |
| *C02F 103/18* | (2006.01) |

(52) U.S. Cl.
CPC .............. *B01D 21/18* (2013.01); *C02F 1/00* (2013.01); *C02F 11/121* (2013.01); *C02F 2001/007* (2013.01); *C02F 2103/18* (2013.01)

(58) Field of Classification Search
CPC ............... B01D 21/18; B01D 21/2405; B01D 21/2427; B01D 21/01; B01D 21/0087; B01D 21/06; B01D 21/2411; B01D 21/00; B01D 21/08; B01D 21/24; B01D 21/2416; B01D 2221/04; C02F 11/121; C02F 1/00; C02F 2001/007; C02F 2103/18; C02F 1/5281; C02F 1/38
USPC .............................. 210/519, 528, 532.1, 801
See application file for complete search history.

(56) References Cited

U.S. PATENT DOCUMENTS

| | | | | |
|---|---|---|---|---|
| 1,741,498 A | * | 12/1929 | Bousman ............... | B01D 21/06 210/529 |
| 2,499,460 A | * | 3/1950 | Chelminski ............ | B01D 21/18 210/528 |
| 2,880,877 A | * | 4/1959 | Sambraus .............. | B01D 21/06 210/530 |
| 2,963,157 A | * | 12/1960 | Remagen ........... | B01D 21/2405 210/803 |
| 3,327,867 A | * | 6/1967 | Hikes ................... | B01D 21/003 210/525 |

(Continued)

FOREIGN PATENT DOCUMENTS

GB         391240 A * 4/1933 ............... B03B 5/58

*Primary Examiner* — Nam X Nguyen
*Assistant Examiner* — Ekandra S. Miller-Cruz
(74) *Attorney, Agent, or Firm* — Vitale, Vickrey, Niro & Gasey LLP

(57) ABSTRACT

A clarifier with an improved rake comprising a plurality of arms, wherein each arm of the rake including a series of arcuate blades, which each blade increasing in height and angle relative to the rake arm as radial distance of the blade relative to the center of the rake decreases.

4 Claims, 5 Drawing Sheets

(56) References Cited

U.S. PATENT DOCUMENTS

| | | | | |
|---|---|---|---|---|
| 3,662,896 A | * | 5/1972 | Pink | B01D 21/06 |
| | | | | 210/525 |
| 4,222,879 A | * | 9/1980 | Hill | B01D 21/0042 |
| | | | | 210/520 |
| 2013/0256243 A1 | * | 10/2013 | Laros | B01D 21/2427 |
| | | | | 210/800 |

* cited by examiner

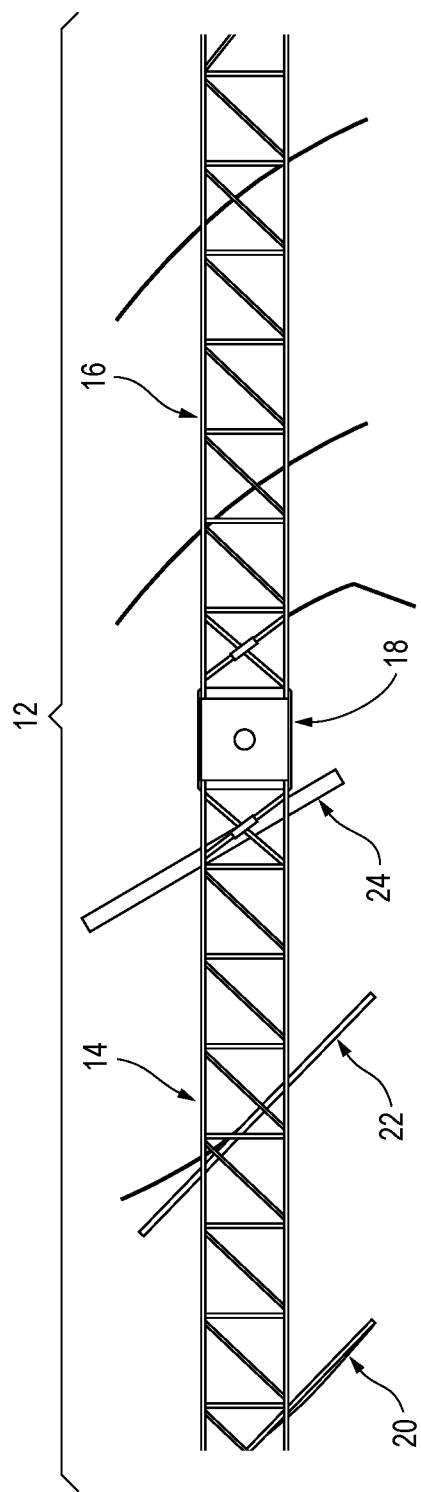

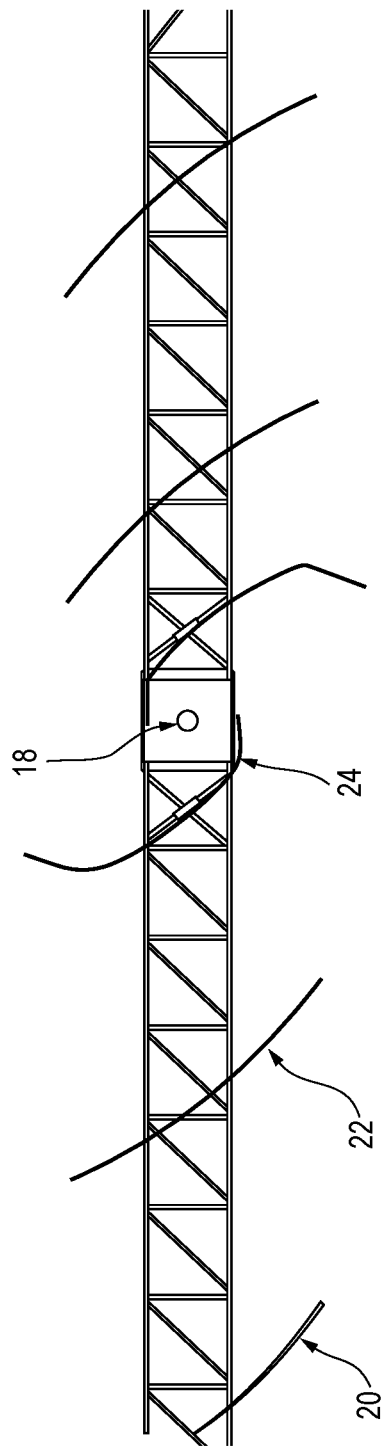

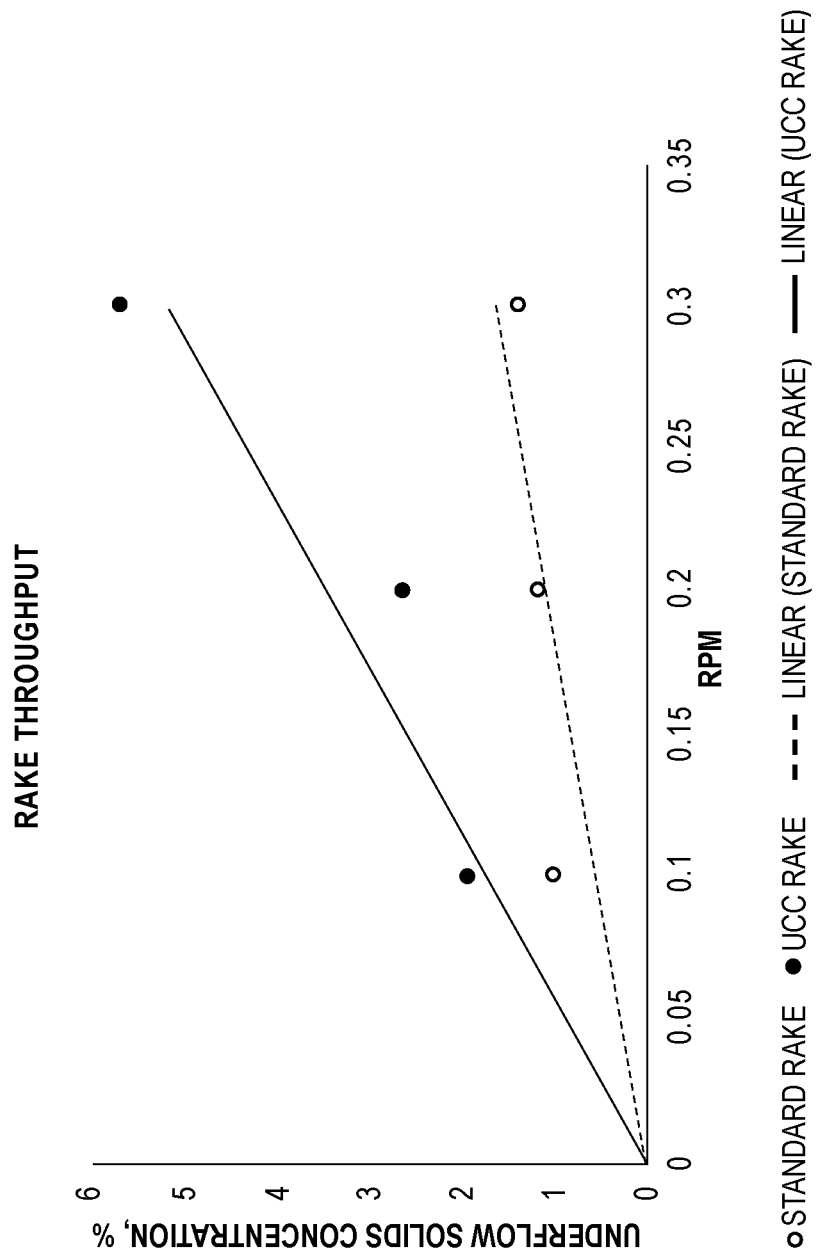

CLARIFIER RAKE CONFIGURATION AND SYSTEM AND METHOD INCLUDING THE SAME FOR BOTTOM ASH HANDLING RELATED TO FLUE GAS DESULFURIZATION

FIELD OF INVENTION

The present disclosure relates to an improved clarifier rake configuration for improved efficiency in increasing sludge solids in the sludge processed by a clarifying tank. More particularly, the present invention is directed to a clarifier rake configuration to provide for the consistent delivery of particles to the wherein each arm of the rake including a series of arcuate asymmetrical spiral patterned blades, which each blade increasing in height and angle relative to the rake arm as radial distance of the blade relative to the center of the rake decreases.

BACKGROUND OF THE INVENTION

The combustion of coal in power generation facilities produces solid waste, such as bottom and fly ash, and flue gas that is emitted to the atmosphere. Many plants are required to remove emissions from the flue gas using flue gas desulfurization (FGD) systems.

Wet FGD technologies typically entail a slurry reactor section and a solids dewatering section. Various types of absorbers have been used, including packed and tray towers, venturi scrubbers, and spray scrubbers in the reactor section. The absorbers neutralize the acidic gasses with an alkaline slurry of lime, sodium hydroxide, or limestone. For a number of reasons, many newer scrubbers use a limestone slurry.

When limestone reacts with $SO_x$ in the reducing conditions of the absorber, $SO_2$ (the major component of $SO_x$) is converted into sulfite, and a slurry rich in calcium sulfite is produced. Newer FGD systems employ an oxidation reactor in which the calcium sulfite slurry is converted to calcium sulfate (gypsum); these are sometimes referred to as limestone forced oxidation (LSFO) FGD systems. These systems typically operate with suspended solids comprising fine and coarse gypsum solids, fly ash, and inert material introduced with the limestone.

When the solids or corrosive fractions such as chlorides reach an upper limit, slurry is purged. Most LSFO FGD systems use mechanical solids separation and dewatering systems to separate gypsum and other solids from the purge water. First stage separation is often accomplished using cyclones which can remove 98% of solids. The remaining 2% solid slurry must be further treated to less than 30 ppm monthly average before it can be discharged outside of the plant boundaries. One such typical second stage polishing dewatering system is the use of a clarifier settling tank built with mechanical means for continuous removal of solids being deposited by sedimentation. Such a clarifier can be used to remove solid particulates from the liquid slurry for further processing and/or removal. The clarifier can further include the use of a clarifier rake comprising a plurality of arms rotating around a center point, each arm including one or more of blades for pushing the particulates towards a centrally located opening for removal. One difficulty, however, with such solids dewatering devices in the field of FGD is the tendency of such particles to agglomerate due to a sharp jagged crystalline shape. Such agglomerations result from an inefficient axial propulsion of the solids toward the center discharge. Inefficiencies result from a tangentially moving paddle trying to change the movement of solids 90 degrees along the rake axis. Those skilled in the art will understand the difficulty of this endeavor. Inefficient movement of the solids can create piles of solids that easily exceed the height of the rake paddles. At this point, severe uncontrolled avalanching of the piles will occur in all directions away from the paddles due to the underwater angle of repose of such solids. That is, FGD purge water creates a risk that the particulate can easily accumulate and suddenly block the removal openings for a clarifier unless removed in a consistent manner.

DESCRIPTION OF THE PRIOR ART

A typical conventional clarifier sludge removal system includes rake arms with blades of straight configuration, mounted at an oblique angle to the length of the rake arm. A series of three or four of these are arranged parallel to one another, spaced apart so as to act as a comb, simply pushing or urging the settled sludge in the clarifier by an incremental distance with each revolution. However, such a configuration has multiple shortcomings which fail to provide the necessary efficiency for an FGD sludge dewatering operation. Specifically, the use of the flat blades in such designs fails to move particulate quickly and efficiently enough to the centrally located removal point or well to enable the consistent and efficient removal of the particulate.

Other, more recent approaches in the field of waste water remediation do not solve these problems. For instance, U.S. Pat. No. 9,861,812 (Haggard et al.) teaches clarifier rake blades flights and attached squeegees that are non-linear and shaped to induce the flow of sludge to the pickup tubes quickly, usually within a single rotation of the rake arm. For example, Haggard teaches that a clarifier of 60-foot diameter using two pickup tubes included along the length of each rake arm, one blade flight can be provided for each, feeding the sludge to that pickup point without the need for "combing" the sludge incrementally along the floor a relatively short distance with each pass of the rake. Haggard et al. further teaches this approach by using continuous blade flights that are curved, forming a concave shape facing forwardly, and can be arcuate or spiral, with varying radius along the length of the curve. However, Haggard et al. is directed towards wastewater, not a high volume high partial specific gravity material such as FGD sludge. Such an approach to move the center discharge toward the rake arm acknowledges the tangential to axial movement problem but fails to provide a "vacuum cleaner" method that will work effectively with high specific gravity high flow rate of solids, nor does it teach a method for effectively pushing an agglomerating particulate to a single collection point in an efficient manner.

Thus, the present disclosure is directed to overcoming these shortcomings in the prior art to enable the efficient dewatering of FGD sludge through the consistent provision of such sludge through a collection point.

DEFINITION OF TERMS

The following terms are used in the claims of the patent as filed and are intended to have their broadest plain and ordinary meaning consistent with the requirements of the law.

"blade angle" means the angle formed by a tangent of a blade (preferably an arcuate blade) at the rake arm relative to the clarifier rake arm to which the blade is attached.

Where alternative meanings are possible, the broadest meaning is intended. All words used in the claims set forth below are intended to be used in the normal, customary usage of grammar and the English language.

OBJECTS AND SUMMARY OF THE DISCLOSURE

The present disclosure achieves the objects as set forth herein by design geometry of the clarifier rake blades as attached to the rake arm. Specifically, in preferred embodiments of the invention as described below, the present disclosure comprises a clarifier including a rake having a plurality of arms, each arm having an array (e.g., two, three or four) blades thereon, with each blade having an arcuate profile, and each blade having an increase in height and an increase in blade angle relative to each more radially outward blade on the same arm. Thus, this blade geometry can provide a consistent delivery of FGD sludge particulate to a collection well or drain for storage or further processing without creating an increased risk of inventorying solids on the bottom of the clarifier and creating uncontrolled avalanching of such solids resulting in blockage or clogging due to the heavy agglomerating nature of the particulate being processed.

Thus, it can be seen that one object of the present disclosure is to provide an improved clarifier for processing FGD sludge.

Another object of the present disclosure is to provide for the consistent controlled repeatable "avalanching" of FGD sludge into the collection well or sink of a clarifier.

Still another object of the present disclosure is to provide a system and structure for the efficient dewatering of high volume, high partial specific gravity (e.g., >2.0) effluent.

Yet another object of the present disclosure is to provide a system and structure for the efficient dewatering of a large volume clarifier using a rake operating at a low speed (e.g., 10 minutes/revolution).

It will be understood that not every claim will employ each and every object as set forth above in the operation of the present invention. However, these and other objects, advantages and features of the invention will be apparent from the following description of the preferred embodiments, considered along with the accompanying drawings.

BRIEF DESCRIPTION OF THE DRAWINGS

FIG. 3a shows a top view of a clarifier rake in accord with an embodiment of the present invention.

FIG. 3b shows a top view of clarifier rake blades in accord with an embodiment of the present invention.

FIG. 4 the efficacy of the present invention (rake throughput) on small scale models in comparison to known conventional rake configurations.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1:
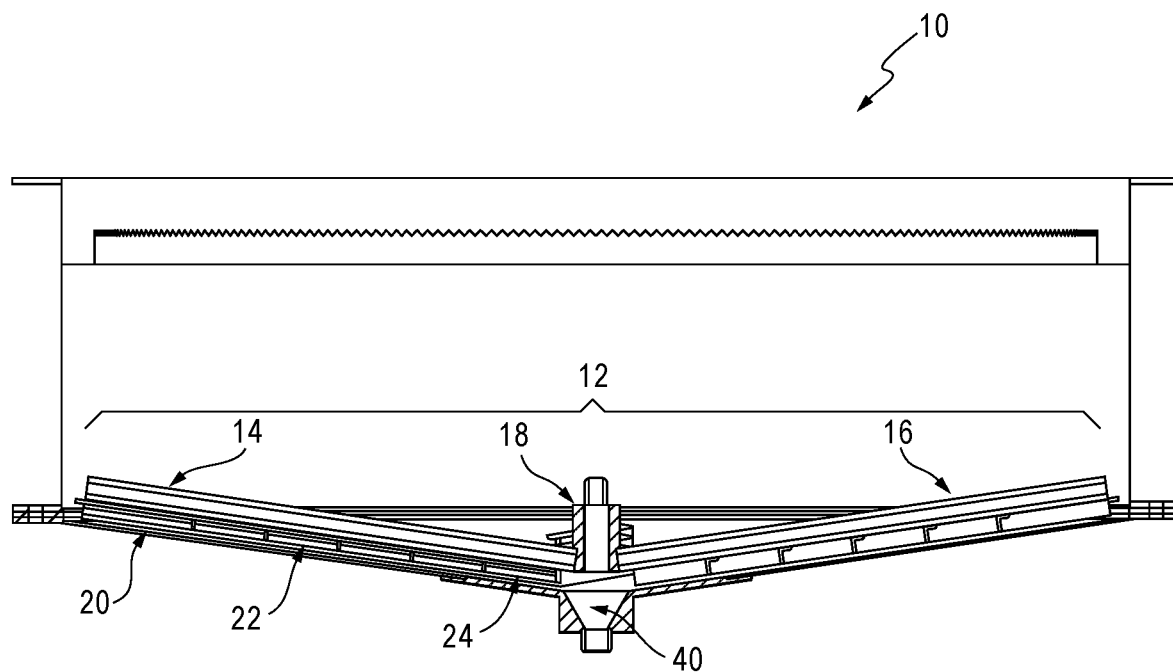
FIG. 1 shows a cutaway side view of a clarifier architecture in accord with an embodiment of the present invention.
Figure 2:
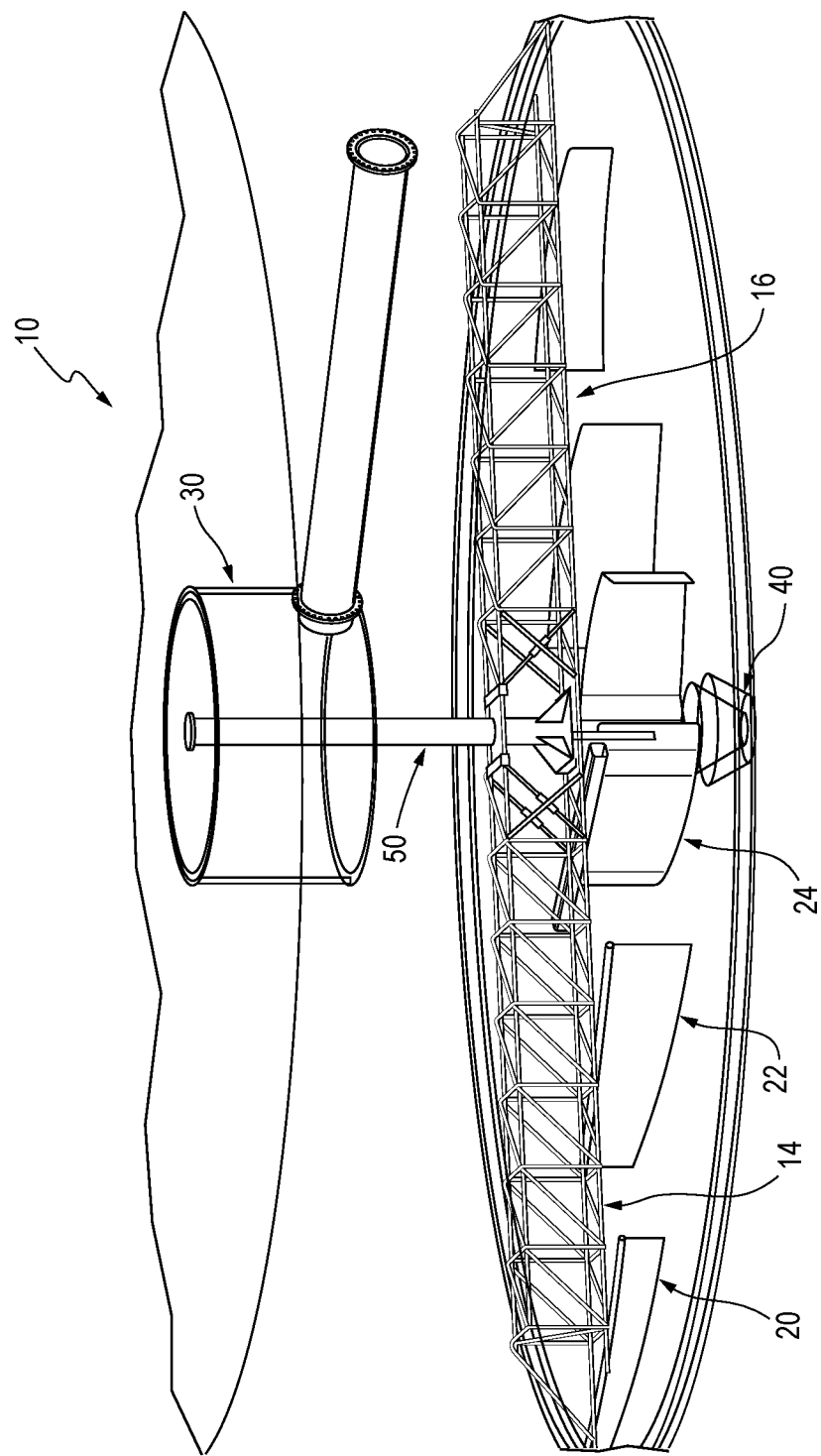
FIG. 2 shows a cutaway perspective view of a rake arm with a series of blades positioned thereon in accord with an embodiment of the present invention.

FIGS. 1 and 2 show a clarifier 10 employing a rake 12 comprising a plurality of arms 14, 16 connected via a center axis 18. On each arm 14, 16 is an array of arcuate blades 20, 22, 24. In operation, the influent (in this embodiment FGD sludge) enters through a feed well 30, wherein the particulate settles downward and is scraped by the blades 20, 22, 24 toward the center well of the clarifier where the sludge is removed through a sink or drain 40 through sludge pipe 50 for further processing, mediation or storage as desired.

As shown in FIGS. 3A and 3B, the geometry on the blades enables the more efficient gathering and "avalanching" of the FGD sludge down the drain in the operation of the disclosed embodiment. That is, if one were to draw a tangent off of the arc formed by blade 20 (i.e., the most radially outward blade on arm 14) at the point at which it connected to arm 14, the resulting angle between blade 20 and the arm 14 would be more acute than the comparable angle formed between of blade 22 and arm 14. Similarly, the angle between blade 22 and arm 14 would be more acute than the comparable angle between blade 24 and arm 14. For example, in a prophetic example of this embodiment, the angle between blade 20 and arm 14 would be 30 degrees, while the angle between blade 22 and arm 14 would be 45 degrees, and the comparable angle between blade 24 and arm 14 would be 60 degrees.

In addition, the geometry of the blade array in this embodiment is such that the height (i.e., vertical dimension in FIGS. 1 and 2) similarly increases from blade 20 to blade 22 and blade 24. Thus, in the example of this embodiment, for a very large (e.g., 100 ft. diameter) clarifier, blade 20 might be 2' high, blade 22 would be 4' high, and blade 24 would be 6' high. The blade array 20, 22, 24 thus increases efficiency of the rake by providing the necessary changes in geometry to support the increased concentration of particulate proximate to the drain 40 in order to enable the consistent "avalanching" or pouring of sludge particulate into the drain 40 in order to ensure the continued operation of the system without an increased risk of blockage or clogging, despite the agglomerating nature of the sludge involved.

Further, the path of the solids along the clarifier floor with such a blade configuration is now a spiral pattern, as opposed to the known systems which use a concentric circle pattern. Those skilled in the art will understand, given the disclosure, that the most efficient way to move solids axially when propulsion is tangentially directed necessitates the use of a spiral in which the least amount of spirals or full rake arm rotations move the solids to the center. Thus, the present spiral rake blade pattern the blade design promotes avalanching of solids in the direction of the center far more so than other directions. A key in the present disclosure to efficient movement of solids along the clarifier floor is a spiral blade configuration coupled with a blade design that promotes consistent biased avalanching of solids toward the center discharge point.

The applicants have tested the efficacy of the present invention (rake throughput) on small scale models in comparison to known conventional rake configurations. This comparison is measured and shown in FIG. 4 as a function of underflow solids concentration (i.e., percentage of solids as a function of volume for materials received through the sink or drain 40.

Since the standard rake is inefficient moving the solids toward the center, it is not sensitive to increases in rake speed (i.e., an increase in speed does not materially increase collection of solids). The new configuration disclosed in the present invention is by comparison more efficient responding to increased speed in ranges commonly used with the present application (e.g. 0.1 to 0.3 rpm).

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

We claim:

1. A clarifier rake for processing sludge, comprising:
   a. a plurality of arms rotating about a center axis, each of the plurality of arms having a free distal end and a proximal end attached to the center axis;
   b. an array of blades on at least one of the plurality of arms for processing the sludge in a spiral path towards the center axis, wherein each array of blades comprises at least a first blade and a second blade, the first blade being closer than the second blade to the free distal end of the at least one of the plurality of arms, wherein the first blade has a more acute angle than the second blade, and the second blade has a larger height than the first blade.

2. The clarifier rake of claim 1, wherein each of the array of blades is arcuate.

3. A clarifier rake for processing sludge, comprising:
   a) a plurality of arms rotating about a center axis, each of the plurality of arms having a free distal end and a proximal end attached to the center axis;
   b) an array of arcuate blades on at least one of the plurality of arms for urging the sludge in a spiral path towards the center axis, wherein each array of blades comprises at least a first blade, a second blade and a third blade, the first blade being closer than the second blade or the third blade to the free distal end of the at least one of the plurality of arms, and the third blade being closer than the second blade or the first blade to the proximate end of the at least one of the plurality of arms, wherein the first blade has a more acute angle than the second blade, the second blade has a more acute angle than the third blade, the third blade has a larger height than the first blade, and the second blade has a larger height than the first blade.

4. A clarifier for processing FGD sludge particulate comprising:
   a. A clarifier tank;
   b. A clarifier rake comprising two or more arms rotating around a center axis, each of the plurality of arms having a free distal end and a proximal end attached to the center axis;
   c. A well on the bottom of the clarifier tank for receiving FGD sludge particulate;
   d. An array of arcuate blades on at least one of the two or more arms for pushing FGD sludge particulate to the well in an spiral path, wherein each array of blades comprises at least first and a second blades, the first blade being closer than the second blade to the free distal end of the at least one of the plurality of arms, wherein the first blade has a more acute angle than the second blade, and the second blade has a larger height than the first blade.

* * * * *